(12) United States Patent
Kuwata et al.

(10) Patent No.: US 7,275,088 B2
(45) Date of Patent: Sep. 25, 2007

(54) SYSTEM AND METHOD FOR ROUTING ELECTRONIC DOCUMENTS

(75) Inventors: Katie Kuwata, San Juan Capistrano, CA (US); William Su, Riverside, CA (US); Truc Nguyen, San Diego, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 846 days.

(21) Appl. No.: 10/402,613

(22) Filed: Mar. 28, 2003

(65) Prior Publication Data

US 2004/0215729 A1 Oct. 28, 2004

(51) Int. Cl.
*G06F 15/16* (2006.01)

(52) U.S. Cl. .................................... 709/218

(58) Field of Classification Search ............... 709/246, 709/218
See application file for complete search history.

(56) References Cited

U.S. PATENT DOCUMENTS

| | | | |
|---|---|---|---|
| 5,768,528 A * | 6/1998 | Stumm ...................... 709/231 |
| 5,801,689 A | 9/1998 | Huntsman | |
| 5,838,326 A | 11/1998 | Card et al. | |
| 5,949,412 A | 9/1999 | Huntsman | |
| 6,061,695 A | 5/2000 | Slivka et al. | |
| 6,138,150 A | 10/2000 | Nichols et al. | |
| 6,160,552 A | 12/2000 | Wilsher et al. | |
| 6,272,485 B1 | 8/2001 | Sragner | |
| 6,362,894 B1 | 3/2002 | Shima | |
| 6,460,036 B1 * | 10/2002 | Herz ........................... 707/10 |
| 6,925,595 B1 * | 8/2005 | Whitledge et al. .......... 715/513 |
| 6,980,305 B2 * | 12/2005 | Martinez .................... 358/1.1 |
| 7,020,658 B1 * | 3/2006 | Hill .............................. 707/102 |
| 7,051,073 B1 * | 5/2006 | Dutta .......................... 709/206 |
| 2002/0099829 A1 * | 7/2002 | Richards et al. ........... 709/227 |
| 2002/0138564 A1 * | 9/2002 | Treptow et al. ............ 709/203 |
| 2003/0093565 A1 * | 5/2003 | Berger et al. ............... 709/246 |
| 2004/0111476 A1 * | 6/2004 | Trossen et al. ............. 709/206 |
| 2004/0205621 A1 * | 10/2004 | Johnson et al. ............ 715/523 |
| 2007/0044017 A1 * | 2/2007 | Zhu et al. .................. 715/530 |
| 2007/0094353 A1 * | 4/2007 | Brown ....................... 709/218 |

* cited by examiner

*Primary Examiner*—Andrew Caldwell
*Assistant Examiner*—Douglas Blair
(74) *Attorney, Agent, or Firm*—Tucker Ellis & West LLP

(57) ABSTRACT

This invention is directed to a system and method for routing electronic documents. More particularly, this invention is directed to a system and method for transferring at least one of a plurality of documents to at least one of a plurality of destinations.

20 Claims, 4 Drawing Sheets

SYSTEM AND METHOD FOR ROUTING ELECTRONIC DOCUMENTS

BACKGROUND OF THE INVENTION

This invention is directed to a system and method for routing electronic documents. More particularly, this invention is directed to a system and method for transferring at least one of a plurality of documents to at least one of a plurality of destinations.

Enterprises around the world are recognizing that information is the currency of their business. As such, there is tremendous value in ensuring that all corporate information, whether in structured or unstructured formats is captured, managed, and put to work in a meaningful and efficient way. Document management and content management solutions help organizations maximize the use of their unstructured data, which in turn helps maximize the use of their corporate knowledge. Unstructured data is information stored in text files, emails, documents, multimedia, etc.

In popular operating system platforms (e.g., Microsoft Windows family), a user navigates the local file system using the integrated operating system file management system (e.g., Windows Explorer). Through the use of this tool, documents can be manipulated in a variety of ways, e.g., moved, copied, and deleted. In addition, a benefit of document management systems is that they facilitate collaboration. One such method is providing document distribution functionality so that one user can easily share documents with or send documents to other users, devices or systems. Users frequently copy and move documents to various destinations. Unfortunately, the document distribution functionality of document management systems generally calls for a user to manually select an appropriate distribution function for each document in the document management system. In addition, in a web-server based system, the copy and move functions usually involve four separate steps as the drag-drop feature is not readily available to the user due to the limitations of the web browser and the request-response mechanism of the web server. For example, the user must first select the source documents, select the copy or move function, selection a destination, and then select paste. It would be preferable, however, if document distribution functionality provided users with the ability to easily transfer at least one document to at least one of a plurality of destinations.

SUMMARY OF THE INVENTION

In accordance with the present invention, there is provided a document management system with improved document distribution functionality.

Further in accordance with the present invention, there is provided a document management system with improved document distribution functionality for a web-based server system.

Further in accordance with the present invention, there is provided a system and method for transferring a subset of a plurality of documents to at least one of a plurality of selected destinations.

Still further in accordance with the present invention, there is provided a system for routing electronic documents. The system is comprised of a memory adapted for storing electronic document data representative a plurality of electronic documents and means adapted for receiving user-specified routing data, which routing data is specifying selections of the plurality of output destinations to which the electronic documents will be transferred. The system is further comprised means adapted for receiving user-specified document selection data, which document selection data is representative of a subset of the plurality of electronic documents for which transfer is desire and output means adapted for selectively communicating electronic documents to at least one of a plurality of output destinations in accordance with the routing data The system is also preferably comprised of means adapted for transferring electronic documents to at least one output destination in accordance with the user-specified routing data.

Still further, in accordance with the present invention, there is provided a method for routing electronic documents. The method is comprised of the steps of storing electronic document data representative a plurality of electronic documents, receiving user-specified routing data, which routing data is specifying selections of the plurality of output destinations to which the electronic documents will be transferred and receiving user-specified document selection data, which document selection data is representative of a subset of the plurality of electronic documents for which transfer is desired. The method is also preferably comprises the step of transferring electronic documents to at least one output destination in accordance with the user-specified routing data.

These and other advantages, aspects, and features will be understood by one of ordinary skill in the art upon reading and understanding the specification.

DETAILED DESCRIPTION OF THE PREFERRED EMBODIMENT

This invention is directed to a system and method for routing at least one electronic document to at least one of a plurality of output destinations, such as, electronic mail servers, Internet servers, data storage areas, and document management systems. The document management system preferably provides access to a document management repository via a folder incorporated into the existing operating system file structure. Although the present invention is described as enabling users to access document management functionality from a Microsoft Windows operating system, it will be appreciated to those skilled in the art that the present invention is also suitably designed to interact with any operating system, such as Unix, Linux, Macintosh or other operating system. In one embodiment, the document management platform provides access to network-based documents via a browser, such as Internet Explorer or Netscape. In the presently preferred embodiment, a document repository managed by the document management platform is represented as a folder or data storage area within an Internet Explorer window. The document management platform permits a user to perform operations on the at least one electronic document, preferably insofar as the user has the appropriate access rights, as will be appreciated by those skilled in the art.

Figure 1:
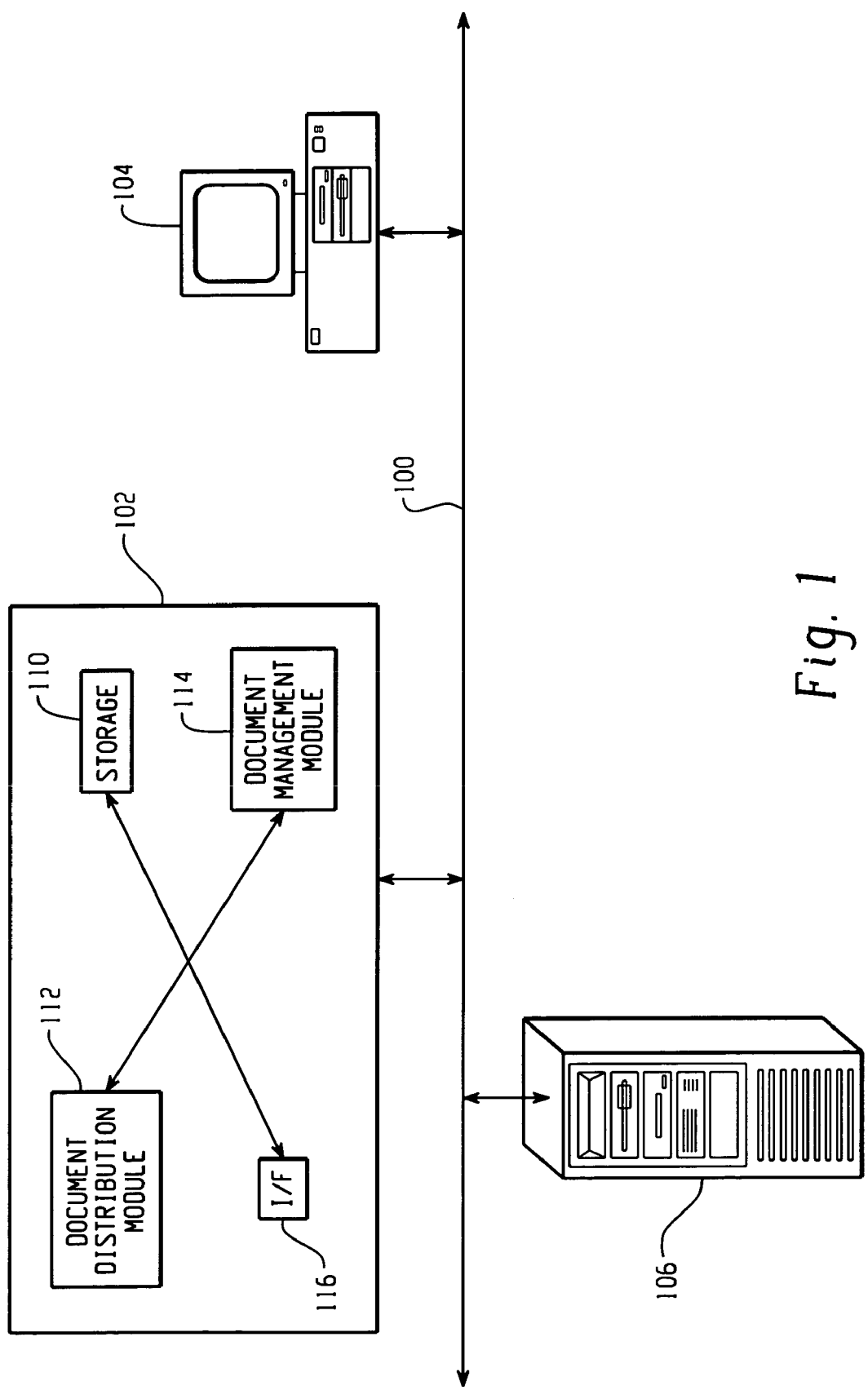
FIG. 1 is a diagram illustrating a preferred embodiment of the system according to the present invention.

Referring now to FIG. 1, an illustration of a network environment for practicing the present invention is provided. The system comprises a data transport network 100 illustrative of a LAN or WAN environment in which a preferred embodiment is provided, such as a packet-switched TCP/IP-based global communication network. The network 100 is suitably any network and is preferably comprised of physical layers and transport layers, as illustrated by a myriad of conventional data transport mechanisms like Ethernet, Token-Ring™, 802.11(b), or other wire-based or wireless data communication mechanisms as will be apparent to one of ordinary skill in the art.

Connected to a data transport network 100 is a document management platform 102. The document management platform is suitably operable to provide services to at least one computer 104, and/or at least one server 106 connected to network 100. It is suitably a document distribution solution with document management capabilities.

The document management platform 102 is preferably a client/server system, which is suitably implemented in both single and collaborative corporate workgroups (although not limited to such environments) and designed to increase productivity and reduce costs by making document communications more simple and reliable. The document management platform 102 suitably provides functionality enabling users to share documents and perform selected operations on such documents. Also connected to data transport network 100 is computer 104. The computer 104 is suitably either a server or client running on any operating system, such as Windows NT, Windows 2000, Windows XP, Unix, Linux, Macintosh or other operating system. In addition, the computer 104 is suitably a thick client or thin client, as will be appreciated by those skilled in the art. Optionally, a server 106 is also connected to data transport network. The server 106 is suitably any fully functional server with the necessary hardware and software to ensure proper operation. The server 106 is suitably a database server configured for selective query support, selective data access, data archiving, and the like, an electronic mail server, an application server, or any server configured for performing a function across a network.

The document management platform 102 preferably comprises a document distribution module 112 and a document management module 114. It should be noted that the document management platform 102 is not limited to these particular modules, and suitably comprises additional modules for device management. The main function of the document management module 114 is to store documents in a central document repository and to facilitate user capability to modify documents, collaborate during document editing, and search and locate stored documents. The main function of the document distribution module 112 is to route jobs to their destinations such as image generating devices, servers, computers, a document repository, etc.

The document management platform 102 also suitably comprises internal storage, in which at least one document repository or data storage area is suitably maintained. The document management platform 102 preferably interfaces with data transport network 100 via network interface 116. Thus, the document management platform 102, server 106, and computer 104 are in shared communication.

The computer 104 suitably represents either a thick client or and a thin client with general interfaces to the document management platform 102. The computer 104 interfaces with the document distribution module 112 for document distribution to selected devices. The document distribution module 112 suitably reports back to the computer 104 the status of the documents forwarded to the document distribution module 112 for distribution.

Figure 2:
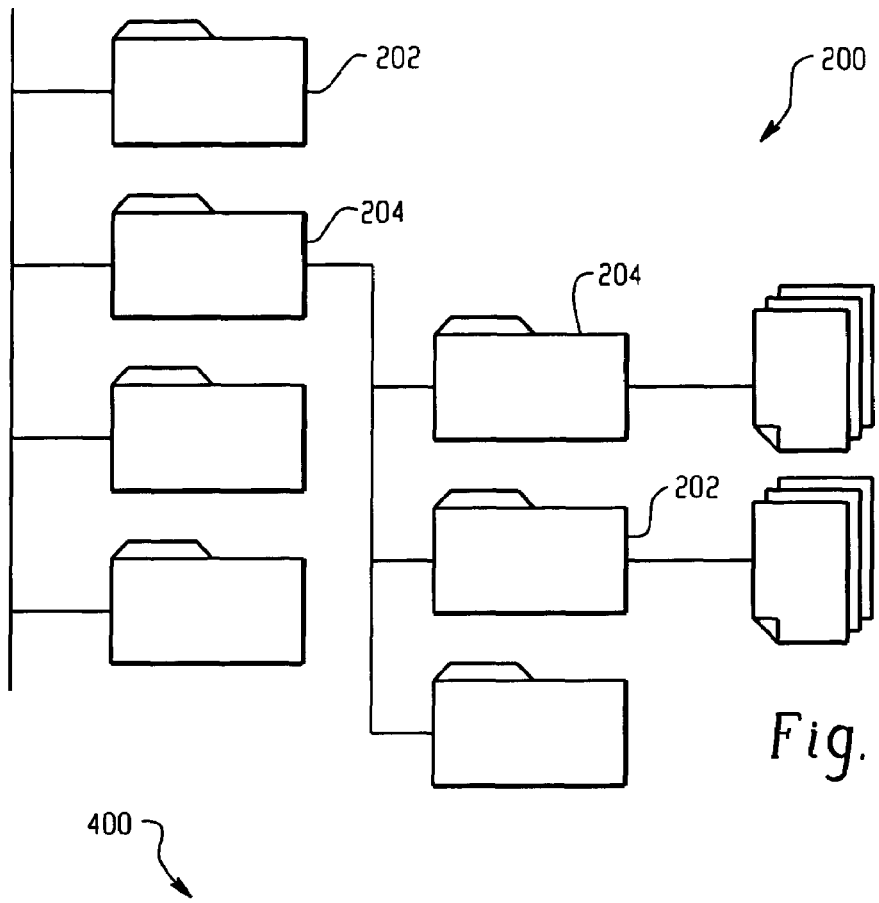
FIG. 2 illustrates a hierarchical tree structure of a repository in a document management system.

The document management module 114 works with the document distribution module 112 and its components to enable users to quickly store and retrieve documents from a central repository via any suitable means, which is preferably stored in storage 111 on the document management module 102, but is also suitably stored on any storage device in communication with data transport network 100. The repository allows a user to share documents and conduct collaborative work between various workgroups. Users of the document management platform 102 preferably utilize a suitable browser-based Graphical User Interface (GUI) from a computer 104 to access documents stored in a repository. The document management platform 102 preferably offers support for conventional browsers, e.g., Microsoft Internet Explorer and Netscape Navigator, through an internal web server which is accessible from a thin client via a browser using the HTTP protocol. Referring now to FIG. 2, there is illustrated a hierarchical folder tree structure of a repository according to the present invention. The repository 200 is suitably comprised of a plurality of file folders or data storage areas. Users can browse through the repository 200 to access file folders and documents. Authorized users can create a hierarchical tree by creating new file folders and documents. Each file folder suitably contains both file subfolders and documents. A user is presented with file folders of two types: a private folder 202 and a group folder 204. The private folder 202 allows only the folder owner access this type of file folder. The folder owner has all rights on the objects contained in it. The private folder 202 is suitably created when an Administrator creates the user account. The group folder 204 is visible to users belonging to the group(s) assigned to this file folder. The operations that a user can perform on objects contained in the group folder 204 are limited to the access rights inherited from the respective group.

In one embodiment, the document management system of the present invention also includes a inbox repository or storage area to post documents or other data related to a certain department. Such storage area is accessed by individuals associated with such department.

The document management system of the present invention allows a user to route at least one document or a subset of a plurality of documents to at least one destination. In order to route the at least one document, the user first defines the parameters for transferring the documents. For example, if the user wants to copy documents, the user selects those destinations associated with that operation. The user then selects at least one document to transfer and at least one destination. The operation associated with each destination is then performed on that document. The destinations include but are not limited to electronic mail servers, Internet servers, data storage areas, and document management systems. The data storage areas include, but are not limited to, private folders, public folders, and group or department folders.

Figure 4:
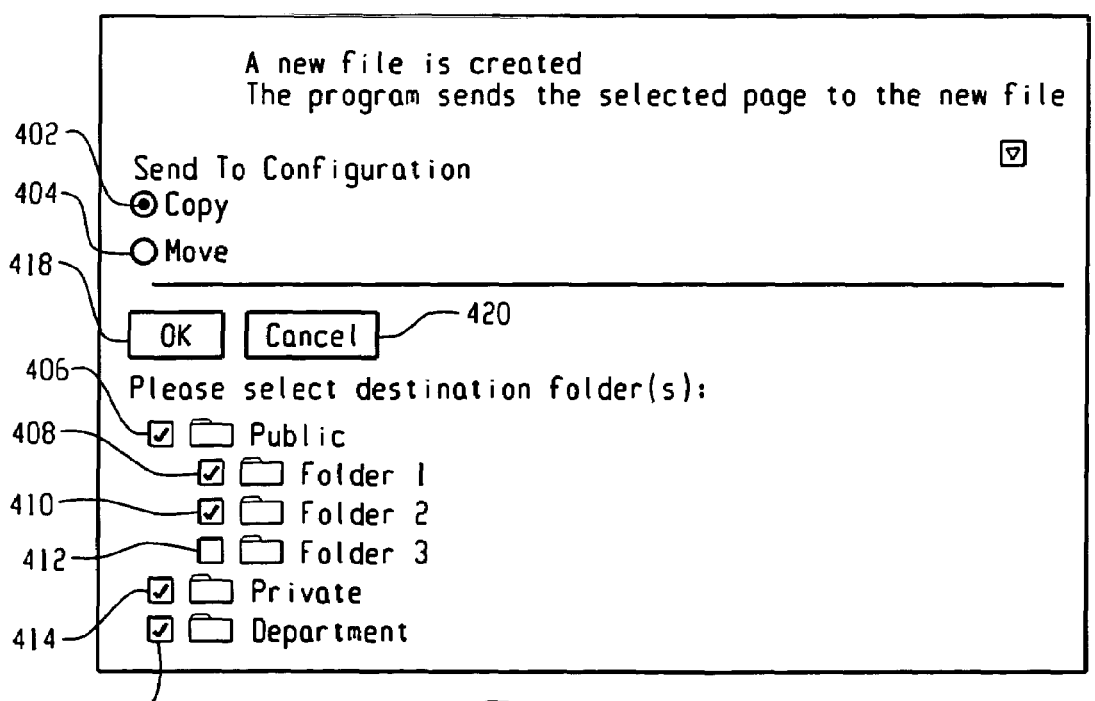
FIG. 4 is a sample screen display for selecting transfer operations and the destinations associated therewith.
Figure 3:
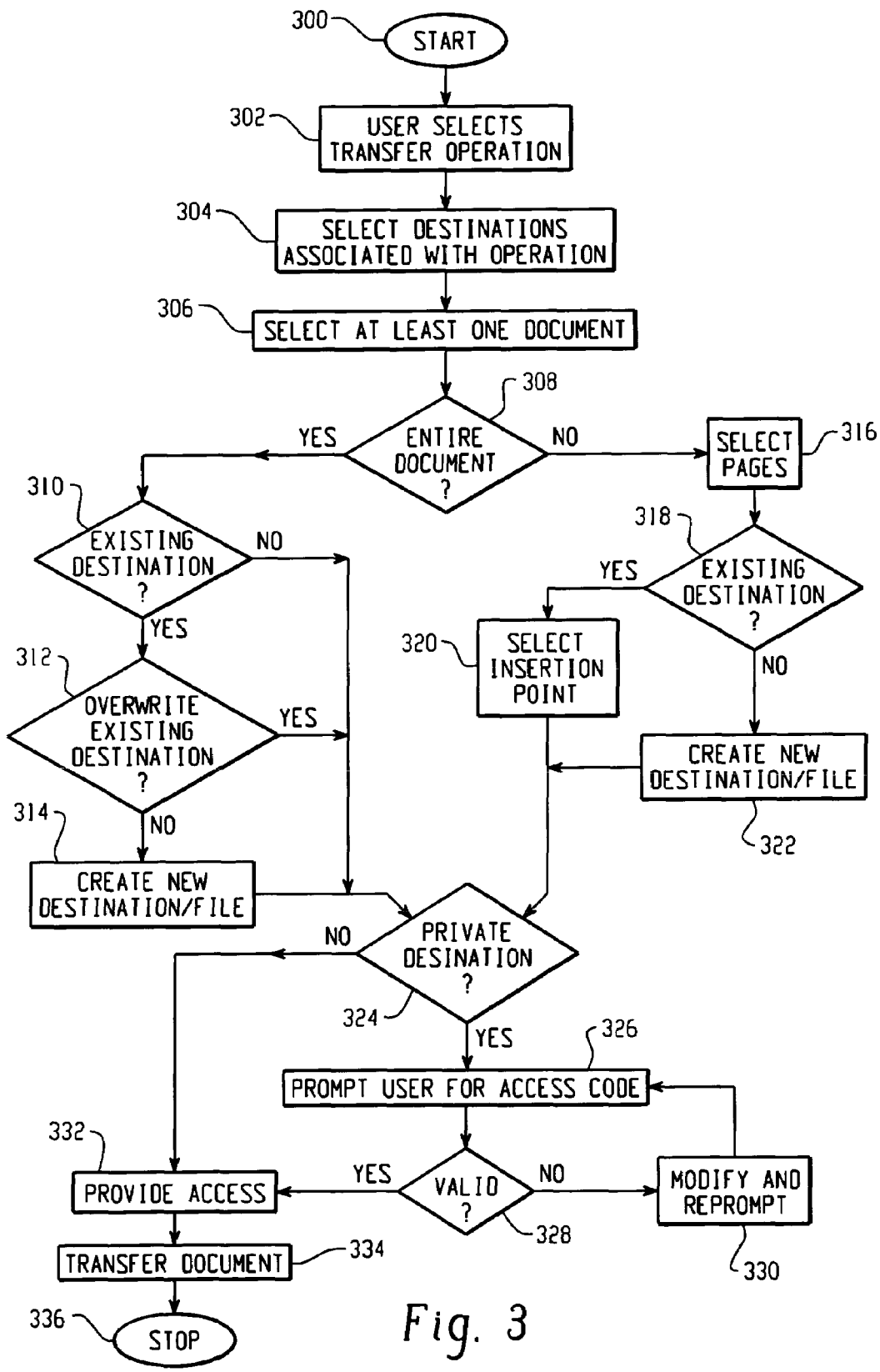
FIG. 3 illustrates a block diagram showing the method according to the present invention.

Referring now to FIG. 3, there is illustrated a flow chart of the process for routing at least one document to at least one of a plurality of destinations according to the present invention. Flow commences at process block 302 wherein the user selects a transfer operation to be performed on selected documents, such as copy or move. Flow then proceeds to process block 304 wherein the user selects at least one destination associated with such operation. A preferred sample screen display 400 is shown in FIG. 4. The user selects the desired operation as either Copy 402 or Move 404. The user then selects the desired destinations associated with such operation as illustrated by those shown at 406, 408, 410, 412, 414, and 416. The user then selects OK 418 to save the parameters selected or Cancel 420 to cancel the selections.

Flow proceeds to process block 306 where the user selects at least one document to transfer to at least one destination. A preferred sample screen display 500 is shown in FIG. 4 for selecting the document or documents to transferred. Region 502 shows the a listing of folders and documents available to be transferred.

Flow then proceeds to decision block 308 wherein a determination is made as to whether the entire document is to be transferred. If the determination is positive determination, flow proceeds to decision block 310 wherein a determination is made as to whether the destination selected is an existing destination. If the determination is negative, flow proceeds to decision block 324 discussed below. If the determination is positive at decision block 310, flow proceeds to decision block 312 wherein a determination is made whether to overwrite any similar documents or files contained within the destination. If the determination is negative, a new document, file, storage area, or destination is created by any suitable means as is required by the situation as shown by 314. If the determination is positive, the existing document or file will be overwritten upon performing the transfer operation and flow proceeds to decision block 324 discussed below.

Figure 5:
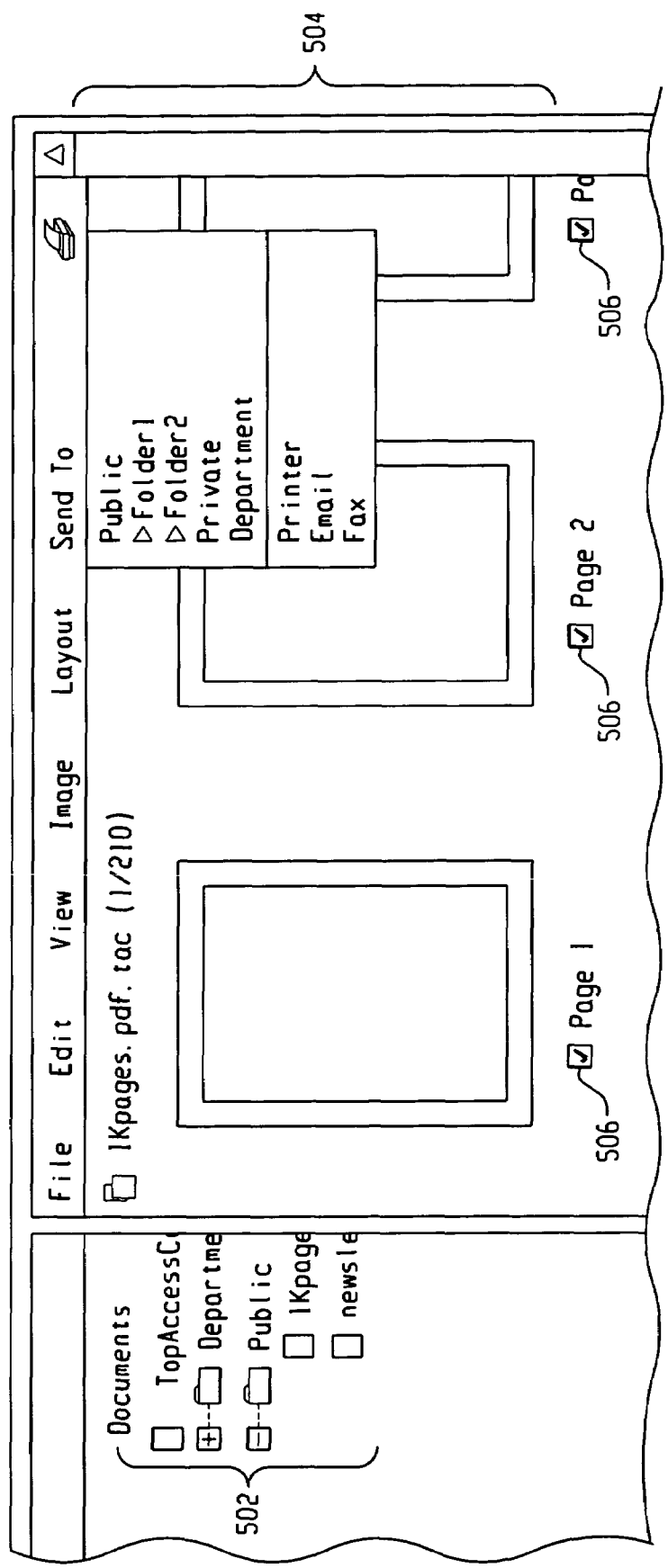
FIG. 5 is a sample screen display for selecting documents to be transferred.

If the determination is negative at decision block 308, flow proceeds to process block 316 wherein a user is requested to select the pages to be transferred. Region 504 in FIG. 5 shows the pages of a selected document. The users checks the associated box 506 for each page to be transferred.

Flow then proceeds to decision block 318 wherein a determination is made whether the destination selected is an existing destination. If it is a positive determination, flow proceeds to process block 320 wherein the user selects an insertion point in the destination file or document for the pages. If the determination is negative, flow proceeds to process block 322 wherein a new document, file, storage area, or destination is created by any suitable means as is required by the situation.

Flow then proceeds to decision block 324 wherein a determination is made whether the selected destination is a private destination. If the determination is negative, flow proceeds to process block 330 discussed below. If the determination is positive, then the process proceeds to process block 326 where the user is prompted to provide a username and password to gain access to the destination.

User rights to the folder are suitably assigned by an Administrator in accordance with the level of access provided to that particular user. For example, the user may be granted full access to his or her documents in private folders, yet restricted to a lesser read-only access to documents in the group folder. The Administrator can set the rights to any user, and to any document location. Note that the username/password login can be implemented as a single login coinciding with the network login, or as separate logins. Thus when the system prompts the user for a username/password as a separate login procedure, flow progresses to decision block 328 wherein a determination is made whether the access code or login is valid.

A negative determination at decision block 328 means that the user entered invalid login information, which causes progress back to process block 330, where the user is again prompted to enter a valid access code or login.

A positive determination at decision block 328 means that the user entered a valid login, which causes progression to process block 332 wherein the user is provided access to the destination. The user is suitably granted access in accordance with the rights assigned by an Administrator and associated with the login information provided by the user.

Flow then proceeds to process block 334 wherein the at least one selected document is transferred to the at least one selected destination in accordance with the parameters provided by the user. The process then stops at 336.

Although system as described runs on a network appliance, it is appreciated that it can also run on other operating systems, for example, Linux (and other Unix operating systems), and operating systems by Apple Computers. Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A system for routing electronic documents comprising:
   a memory for storing electronic document data representative of a plurality of electronic documents;
   means for generating image data corresponding to the plurality of electronic documents on a thin client interface;
   means for receiving user-specified routing data via the thin client interface, which routing data specifies at least one output destination to which electronic document data of the plurality of electronic documents will be transferred;
   means for receiving user-specified document selection data via the thin client interface, which document selection data is representative of a subset of the plurality of electronic documents for which transfer is desired;
   means for receiving user-specified apportionment data representative of a selected portion of at least one electronic document of the subset via the thin client interface;
   means for determining whether at least one of the electronic documents to be communicated to the at least one output destination is substantially identical to an electronic document located within such output destination;
   upon a positive determination, means for determining if an associated user desires to selectively communicate the at least one substantially identical electronic document and replace the electronic document located therein with the substantially identical electronic document; and
   upon a positive determination that a user desires to selectively communicate the at least one substantially identical electronic document and replace the electronic document located therein with the substantially identical electronic document, output means for selectively communicating the at least one substantially identical electronic document to the at least one output destination in accordance with received routing data, document selection data, and apportionment data, and means for replacing the electronic document located therein with the substantially identical electronic document.

2. The system for routing electronic documents according to claim 1 wherein the routing data further includes information about operations to be performed on electronic documents associated with the at least one destination.

3. The system for routing electronic documents according to claim 1 wherein the means for receiving user-specified document selection data includes means for displaying on the thin client interface a listing of electronic documents in the memory.

4. The system for routing electronic documents according to claim 1 wherein the means for receiving user-specified selections of the plurality of output destinations includes means for displaying on thin client interface a listing of output destinations.

5. The system for routing electronic documents according to claim 1 wherein the at least one output destination is selected from the group consisting of electronic mail servers, Internet servers, data storage areas, and document management systems.

6. The system for routing electronic documents according to claim 1 further comprising: upon a negative determination that a user desires to selectively communicate the at least one substantially identical electronic document and replace the electronic document located therein with the substantially identical electronic document, means for receiving user-specified routing data for a new output destination for the electronic document and means for selectively communicating such electronic document to the new output destination in accordance with the routing data.

7. The system for routing electronic documents according to claim 1 further comprising:
means for prompting an associated user for selected information in order for the user to access at least one of the plurality of documents and output destinations; and
means for receiving such selected information from the associated user.

8. The system for routing electronic documents according to claim 7 further comprising:
means for verifying such selected information; and
upon verification of such selected information, means for allowing the associated user access to at least one of the plurality of documents and output destinations upon verification.

9. A system for routing electronic documents comprising:
a memory for storing electronic document data representative of a plurality of electronic documents;
means for generating image data corresponding to the plurality of electronic documents on a thin client interface;
means for receiving user-specified routing data via the thin client interface, which routing data specifies at least one output destination to which electronic document data of the plurality of electronic documents will be transferred;
means for receiving user-specified document selection data via the thin client interface, which document selection data is representative of a subset of the plurality of electronic documents for which transfer is desired;
means for receiving user-specified apportionment data representative of a selected portion of at least one electronic document of the subset via the thin client interface;
means for receiving user-specified electronic document information for specifying the electronic document into which the selected portion of the electronic document is to be selectively communicated;
means for determining if the user-specified electronic document into which the selected portion of the electronic document is to be selectively communicated is located within the at least one output destination; and
based on a positive determination, means for receiving user-specified insertion information specifying a location into which the selected portion of the electronic document is to be inserted and means for selectively communicating the selected portion to the electronic document in accordance with the insertion information.

10. The system for routing electronic documents according to claim 9 further comprising: based on a negative determination that a user-specified electronic document is located within the output destination, means for receiving new user-specified electronic document information for specifying the electronic document into which the selected portion of the electronic document is to be selectively communicated and means for selectively communicating the at least one selected portion of the electronic document in accordance with the new user-specified electronic document information.

11. A method for routing electronic documents comprising the steps of:
storing electronic document data representative of a plurality of electronic documents;
generating image data corresponding to the plurality of electronic documents on a thin client interface;
receiving user-specified routing data via the thin client interface, which routing data specifies at least one output destination to which the electronic document data of the plurality of electronic documents will be transferred;
receiving user-specified document selection data via the thin client interface, which document selection data is representative of a subset of the plurality of electronic documents for which transfer is desired;
receiving user-specified apportionment data representative of a selected portion of at least one electronic document of the subset via the thin client interface;
determining whether at least one of the electronic documents to be communicated to the at least one output destination is substantially identical to an electronic document located within such output destination;
upon a positive determination, determining if an associated user desires to selectively communicate the at least one substantially identical electronic document and replace the electronic document located therein with the substantially identical electronic document; and
upon a positive determination that a user desires to selectively communicate the at least one substantially identical electronic document and replace the electronic document located therein with the substantially identical electronic document, selectively communicating the at least one substantially identical electronic document to the at least one output destination in accordance with received routing data, document selection data, and apportionment data, and replacing the electronic document located therein with the substantially identical electronic document.

12. The method according to claim 11 wherein the routing data further includes information about operations to be performed on electronic documents associated with the at least one output destination.

13. The method according to claim 11 wherein the step of receiving user-specified document selection data includes the step of displaying on the thin client interface a listing of electronic documents in the memory.

14. The method according to claim 11 wherein the step of received user-specified selections of the plurality of output destinations includes the step of displaying on the thin client interface a listing of output destinations.

15. The method according to claim 11 wherein the at least one output destination is selected from the group consisting of electronic mail servers, Internet servers, data storage area, and document management systems.

16. The method for routing electronic documents according to claim 11 further comprising the steps of: upon a negative determination that a user desires to selectively communicate the at least one substantially identical electronic document and replace the electronic document located therein with the substantially identical electronic document, receiving user-specified routing data for a new output destination for the electronic document and selectively communicating such electronic document to the new output destination in accordance with the routing data.

17. The method according to claim 11 further comprising the steps of:
prompting an associated user for selected information in order for the user to access at least one of the plurality of documents and output destinations; and
receiving such selected information from the associated user.

18. The method according to claim 17 further comprising the steps of:
verifying such selected information; and
upon verification of such selected information, allowing the associated user access to at least one of the plurality of documents and output destinations upon verification.

19. A method for routing electronic documents comprising the steps of:
storing electronic document data representative of a plurality of electronic documents;
generating image data corresponding to the plurality of electronic documents on a thin client interface;
receiving user-specified routing data via the thin client interface, which routing data specifies at least one output destination to which the electronic document data of the plurality of electronic documents will be transferred;
receiving user-specified document selection data via the thin client interface, which document selection data is representative of a subset of the plurality of electronic documents for which transfer is desired;
receiving user-specified apportionment data representative of a selected portion of at least one electronic document of the subset via the thin client interface;
receiving user-specified electronic document information for specifying the electronic document into which the selected portion of the electronic document is to be selectively communicated;
determining if the user-specified electronic document into which the selected portion of the electronic document is to be selectively communicated is located within the at least one output destination; and
based on a positive determination, receiving user-specified insertion information specifying a location into which the selected portion of the electronic document is to be inserted and selectively communicating the selected portion to the electronic document in accordance with the insertion information.

20. The method for routing electronic documents according to claim 19 further comprising the steps of: based on a negative determination that a user-specified electronic document is located within the output destination, receiving new user-specified electronic document information for specifying the electronic document into which the selected portion of the electronic document is to be selectively communicated and selectively communicating the selected portion of the electronic document in accordance with the new user-specified electronic document information.

* * * * *